(12) United States Patent
Kubat et al.

(10) Patent No.: US 8,226,066 B2
(45) Date of Patent: Jul. 24, 2012

(54) CENTER-BONDED ISOLATION MOUNTING ASSEMBLY

(75) Inventors: Timothy J. Kubat, Erie, PA (US); Kyle R. Zimmerman, Albion, PA (US); Scott K. Thompson, Erie, PA (US)

(73) Assignee: Lord Corporation, Cary, NC (US)

( * ) Notice: Subject to any disclaimer, the term of this patent is extended or adjusted under 35 U.S.C. 154(b) by 744 days.

(21) Appl. No.: 12/323,880

(22) Filed: Nov. 26, 2008

(65) Prior Publication Data
US 2009/0134292 A1    May 28, 2009

Related U.S. Application Data

(60) Provisional application No. 60/990,575, filed on Nov. 27, 2007.

(51) Int. Cl.
*F16M 13/00* (2006.01)
(52) U.S. Cl. .......... 248/634; 248/635; 267/293
(58) Field of Classification Search .......... 248/635, 248/634, 632, 633, 621, 609, 638, 570, 613, 248/562; 267/293, 141.1, 141.2, 141.3, 141.4, 267/141.5, 141.6, 141.7, 140.12, 294
See application file for complete search history.

(56) References Cited

U.S. PATENT DOCUMENTS

| | | | | |
|---|---|---|---|---|
| 214,470 A | * | 4/1879 | Utz et al. ............... 431/251 |
| 2,457,058 A | * | 12/1948 | Markowitz ............. 267/140.3 |
| 2,757,017 A | * | 7/1956 | Matthias et al. ....... 280/124.116 |
| 2,879,090 A | * | 3/1959 | Everitt et al. ............ 403/227 |
| 2,926,881 A | * | 3/1960 | Painter ................... 267/141.4 |
| 3,091,795 A | * | 6/1963 | Budwig .................... 16/2.1 |
| 3,128,999 A | | 4/1964 | Schmitt |
| 3,266,139 A | * | 8/1966 | Adams ..................... 29/509 |
| 3,304,043 A | * | 2/1967 | Beck ...................... 267/140.5 |
| 3,622,194 A | * | 11/1971 | Bryk ...................... 296/35.1 |
| 3,675,881 A | | 7/1972 | Caldwell |
| 3,756,551 A | * | 9/1973 | Bishop ................... 267/141.1 |
| 3,895,408 A | | 7/1975 | Leingang |
| 4,014,588 A | * | 3/1977 | Kohriyama .............. 296/35.1 |

(Continued)

FOREIGN PATENT DOCUMENTS
EP    1643154 A    4/2006
(Continued)

OTHER PUBLICATIONS
http://scholar.lib.vt.edu/theses/available/etd-4524171049761291/unrestricted/chapter4.pdf. 1997.
(Continued)

*Primary Examiner* — Kimberly Wood
(74) *Attorney, Agent, or Firm* — Richard G. Miller

(57) ABSTRACT

Center-bonded mounts for resiliently connecting a supported structure to a support structure are assembled from members that are adapted to disproportionately affect the axial and radial stiffness of the mount. Each of the members includes a shoulder portion for engaging an opposite side surface of the support structure and a neck portion that extends within a socket formed through the support structure. The shoulder portion of one member disproportionately affects the downward axial stiffness of the mount, and the neck portion of the other member disproportionately affects the radial stiffness of the mount. A mount stiffness characteristic of the individual members can be varied, and the varied members can be interchangeably combined to provide both a greater selection and a greater range of axial and radial stiffness characteristics for a given part count.

22 Claims, 11 Drawing Sheets

U.S. PATENT DOCUMENTS

| | | | |
|---|---|---|---|
| 4,391,436 A | | 7/1983 | Fishbaugh |
| 4,530,491 A | * | 7/1985 | Bucksbee et al. ............. 267/141 |
| 4,783,039 A | * | 11/1988 | Peterson et al. ............. 248/635 |
| 4,869,454 A | * | 9/1989 | Byrne et al. .................. 248/610 |
| 5,158,269 A | * | 10/1992 | Hein et al. ................... 267/220 |
| 5,170,985 A | * | 12/1992 | Killworth et al. ............ 248/635 |
| 5,295,652 A | * | 3/1994 | Byrne ........................... 248/635 |
| 5,580,028 A | | 12/1996 | Tomczak et al. |
| 5,597,173 A | * | 1/1997 | Schindler et al. ...... 280/124.147 |
| 5,651,535 A | | 7/1997 | David |
| 5,743,509 A | * | 4/1998 | Kanda et al. ................. 248/635 |
| 5,799,930 A | | 9/1998 | Willett |
| 6,003,897 A | * | 12/1999 | Dostert et al. ............... 280/781 |
| 6,030,016 A | | 2/2000 | Rice |
| 6,062,763 A | * | 5/2000 | Sirois et al. .................. 403/329 |
| 6,302,385 B1 | * | 10/2001 | Summers et al. ........... 267/140.3 |
| 6,416,030 B1 | | 7/2002 | Bergdahl et al. |
| 6,435,489 B1 | | 8/2002 | Rice et al. |
| 6,471,179 B1 | * | 10/2002 | Tousi et al. .................. 248/634 |
| 6,502,883 B2 | * | 1/2003 | Rice ............................. 296/35.1 |
| 6,523,817 B1 | * | 2/2003 | Landry, Jr. .................. 267/141.4 |
| 6,588,820 B2 | * | 7/2003 | Rice ............................. 296/35.1 |
| 6,692,052 B1 | | 2/2004 | Sutton et al. |
| 6,839,163 B1 | | 1/2005 | Jakobson et al. |
| 7,261,365 B2 | * | 8/2007 | Dickson et al. .......... 296/190.07 |
| 7,389,977 B1 | * | 6/2008 | Fernandez et al. .......... 267/141.4 |
| 7,416,174 B2 | * | 8/2008 | Dickson et al. ............. 267/141.1 |
| 7,510,163 B2 | * | 3/2009 | Schlitzkus et al. ........... 248/635 |
| 2001/0052713 A1 | | 12/2001 | Kim ............................. 296/35.1 |
| 2005/0035511 A1 | * | 2/2005 | Friedrich et al. ............ 267/141.2 |
| 2006/0180965 A1 | | 8/2006 | Howorth et al. |
| 2006/0202400 A1 | * | 9/2006 | Fitzgerald ..................... 267/293 |
| 2008/0191571 A1 | * | 8/2008 | Fukuda et al. ................. 310/91 |
| 2008/0217824 A1 | * | 9/2008 | Schlitzkus et al. .......... 267/141.1 |

FOREIGN PATENT DOCUMENTS

| | | |
|---|---|---|
| WO | 81/00606 | 3/1981 |
| WO | 99/51482 A | 10/1999 |
| WO | 03/066300 A | 8/2003 |
| WO | 2006/091632 A | 8/2006 |

OTHER PUBLICATIONS

Lord Corporation, "Lord Industrial Products", Catalog PC2001k, 1989, pp. 1-25.

Lord Corporation, "Lord Industrial Products", Catalog PC2001k, 1989, pp. 43-77.

Lord Corporation, "Lord Industrial Products", Catalog PC2001k, 1989, pp. 130-132.

http://www.novibration.com/content/view/43/73/, Barry Controls, "Bonded Tube Mounts—HR Series", Oct. 29, 2007.

Lord Corporation, "Center Bonded Mounts—CB-1100 Series, CB-1180 Series, CBA Series, CBA-50 Series, STA Series, Safetied Tubeform Series," pp. 49-62, Nov. 13, 2007.

Lord Corporation, "Two-Piece Mounts—CBB and CBC Series, SSB Series, CB-2200 Series," pp. 67-73, Nov. 13, 2007.

PCT International Search Report and Written Opinion from corresponding PCT International Application No. PCT/US08/84842, dated Apr. 14, 2009.

Lord Corporation, "Center Bonded Mounts—CB-1100 Series, CB-1180 Series, CBA Series, CBA-50 Series, STA Series, Safetied Tubeform Series," pp. 51-64, Rev. 1, Oct. 2008.

Lord Corporation, "Two-Piece Mounts—CBB and CBC Series, SSB Series, CB-2200 Series," pp. 69-75, Rev. 1, Oct. 2008.

* cited by examiner

CENTER-BONDED ISOLATION MOUNTING ASSEMBLY

This application claims the benefit of U.S. provisional patent application No. 60/990,575 filed on Nov. 27, 2007, which the benefit is herein claimed and incorporated by reference.

TECHNICAL FIELD

The invention relates to elastomeric mounting systems, particularly center-bonded mounts exhibiting both axial and radial stiffness, for mounting one body to another while exploiting the elastomeric performance characteristics of the mountings for such purposes as isolating vibrations, controlling motion, accommodating misalignments, and reducing noise associated with structure-borne vibrations.

BACKGROUND OF THE INVENTION

Center-bonded mounts provide flexible suspension systems joining supported members. Although generally intended to carry loads in the axial (e.g., vertical) direction, the center-bonded mounts are capable of supporting static loads in both axial and radial directions while isolating vibrations and withstanding shocks in all directions.

Typically, a cushion of elastomer, which is bonded to the periphery of tubular sleeve, fits within a hole formed through the support member. One end of the elastomer forms a spacer between the supported member and one side of the support member. The other end of the elastomer includes a rebound tail that spreads under compression to engage the other side of the support member. A bolt, which extends through the support and supported members, the two washers, and the tubular sleeve, compresses the elastomer between two washers filling the hole in the support member, squeezing the opposite sides of the support member, and spacing the support and supported members. Tightening the bold draws the two washers against opposite ends of the tubular sleeve for assuring that the elastomer is properly pre-compressed between the support and supported members.

The elastomers behave similarly to coil springs with added damping (hysteresis) based on the molecular structure of the elastomer. The center-bonded mounts exhibit both axial and radial stiffness. However, the axial and radial spring rates are generally not independently controllable.

SUMMARY OF THE INVENTION

The invention among its preferred embodiments features a center-bonded mount assembly composed of at least two mating mounting members, one disproportionally affecting a downward axial load function of the mount assembly and the other disproportionally affecting both an upward axial load function and a radial load function of the mount assembly. Either of the mounting members can be replaced with a similarly adapted mounting member varying in material, modulus, or dimension to favor a relative increase or decrease in downward axial, upward axial, or radial load functions. With an array of such mating mounting members to choose from, the requirements of individual applications for resiliently securing supported structures to support structures with particular downward axial, upward axial, and radial load functions can be met with both greater precision and over a greater range without requiring the design of a much larger number of center-bonded mounts.

A center-bonded mount assembly arranged in accordance with the invention for securing a supported structure to a support structure includes first and second elastomeric bodies having neck and shoulder portions. The neck portions are shaped for extending axially within a socket of the support structure, and the shoulder portions are shaped for extending radially beyond the socket in engagement with opposite side surfaces of the support structure. Inner and outer sleeves are bonded to the first elastomeric body. The inner sleeve extends axially through both the neck and shoulder portions of the first elastomeric body, and the outer sleeve extends axially along the neck portion of the first elastomeric body and radially along the shoulder portion of the first elastomeric body. A channel is formed in the neck portion of the first elastomeric body in a position apart from the inner and outer sleeves. A projection formed by the neck portion of the second elastomeric body is arranged to extend within the channel formed in the neck portion of the first elastomeric body.

An elastomeric material forming the neck portion of the first elastomeric body preferably has a radial thickness less than a radial thickness of an elastomeric material forming the neck portion of the second elastomeric body such that a radial spring rate function exhibited by the mount is influenced more by the neck portion of the second elastomeric body than by the neck portion of the first elastomeric body. The channel preferably has inner and outer sidewalls formed by elastomeric material bonded to the inner and outer sleeves, and the projection preferably has mating inner and outer sidewalls for engaging the sidewalls of the channel. A radial thickness between the sidewalls of the second elastomeric body is preferably less than a radial thickness between the sidewalls of the channel in the first elastomeric body to provide multiple stages of the radial stiffness. The multiple stages include an initial stage of radial stiffness controlled mostly by the shoulder portion of the first elastomeric body and a final stage of radial stiffness controlled mostly by the neck portion of the second elastomeric body. Preferably the final stage occurs after the radial gap is overcome, preferably with the final staging radial gap overcoming the difference in the channel of first body to the neck of second body.

Alternatively, the radial thickness of the sidewalls of the second elastomeric body can be set equal to the radial thickness between the sidewalls of the channel in the first elastomeric body to provide a radial stiffness controlled by the neck portions of both elastomeric bodies. If, in addition, the elastomeric material forming the neck portion of the second elastomeric body has a radial thickness exceeding a radial thickness of the elastomeric material forming the neck portion of the first elastomeric body, then the radial stiffness is predominately controlled by the neck portion of the second elastomeric body.

At least one of the inner and outer sidewalls of the channel in the first elastomeric body can be axially tapered for relatively enlarging an entrance to the channel, and at least one of the mating inner and outer sidewalls of the second elastomeric body can be correspondingly tapered. The axially tapered sidewalls of the first and second elastomeric bodies preferably enter into a frictional engagement during assembly, preferably on either one or both of the inside and outside interfaces, and prior to loading the mount. Preferably frictional engagement on either one or both of the inside and outside interfaces is provided and retention of the body is provided and falling out of the body during installation is inhibited.

The shoulder portion of the second elastomeric body can have a through hole and a recess surrounding the through hole for receiving a washer. A rim surrounding the recess can provide for gripping the washer during assembly and prior to loading the mount. The shoulder portion of the second elastomeric body is also preferably arranged to cooperate with the shoulder portion of the first elastomeric body for axially preloading the mount assembly and for providing a rebound capacity to withstand axial loads in the opposing (upward) direction. The neck portion of the second elastomeric body is preferably sized to extend through both opposite side surfaces of the support structure to spread radial loading along the axial length of the socket.

Another center-bonded mount assembly in accordance with the invention for providing a resilient mounting exhibiting axial and radial spring rate functions between a supported structure and a support structure includes first and second mounting members. The first mounting member includes an inner sleeve and a first elastomeric body surrounding the inner sleeve. The first elastomeric body has a downward axial snubbing portion arranged for engaging adjacent surfaces of the support and supported structures and a first radial snubbing portion arranged for extending within a socket formed through the support structure. The second mounting member includes a second elastomeric body having an upward axial snubbing portion arranged for engaging an opposite side surface of the support structure and a second radial snubbing portion arranged for extending within the socket formed through the support structure. The second radial snubbing portion is arranged with respect to the first radial snubbing portion to provide more influence than the first radial snubbing portion over the radial spring rate of the center-bonded mount assembly.

The second radial snubbing portion can have a radial thickness greater than first radial snubbing portion to provide more influence than the first radial snubbing portion over the radial spring rate function of the center-bonded mount assembly. Alternatively or in addition thereto, the second radial snubbing portion can have a elastic modulus different from first radial snubbing portion. Preferably, the second radial snubbing portion is arranged for engaging the first radial snubbing portion while leaving a radial gap within the socket formed through the support structure to provide multiple stages of radial stiffness. Preferably, the radial spring rate function has at least two stages, a first of the stages exhibiting a lower spring rate than a second of the stages.

An assembly system of center-bonded mounts in accordance with the invention provides a plurality of axial and radial spring rate functions in different combinations for resiliently securing a supported member to a support member. The system includes a plurality of first mounting members each including an inner sleeve surrounded by a first elastomeric body having a downward axial snubbing portion and a first radial snubbing portion and a plurality of second mounting members each including a second elastomeric body having an upward axial snubbing portion and a second radial snubbing portion. The second radial snubbing portions are arranged to provide more influence than the first radial snubbing portions over the radial spring rate function. The first and second elastomeric bodies vary in at least one predetermined "mount stiffness characteristic" for supporting different spring rate functions. The second mounting members are interchangeably engageable with the first mounting members for assembling a plurality of center-bonded mounts exhibiting different axial and radial spring rate functions. Preferably, the at least one predetermined "mount stiffness characteristic" is chosen from a mount stiffness characteristic group including elastomeric body dimension and elastomeric body elastic modulus.

A method of assembling a center-bonded mount is provided in accordance with the invention for resiliently securing a supported member to a support member and includes providing a plurality of first and second mounting members. The first mounting members include an inner sleeve surrounded by a first elastomeric body having a downward axial snubbing portion and a first radial snubbing portion. The second mounting members include a second elastomeric body having an upward axial snubbing portion and a second radial snubbing portion. A first selection is made of one among the first mounting members differing from other of the plurality of the first mounting members in at least one predetermined "mount stiffness characteristic", preferably chosen from a first mounting member mount stiffness characteristic group including at least dimension and elastic modulus for supporting different axial spring rate functions. A second selection is made of one among the second mounting members differing from other of the plurality of second mounting members in at least one predetermined "mount stiffness characteristic", preferably chosen from a second mounting member mount stiffness characteristic group including at least dimension and elastic modulus for supporting different radial spring rate functions. The selected first and second mounting members are tightened into engagement with one another.

Preferably, the first elastomeric body provides more influence on a downward axial spring rate function, the second elastomeric body provides more influence on an upward axial spring rate function, and the second radial snubbing portion provides more influence than the first radial snubbing portion on the radial spring rate function. The second radial snubbing portion is preferably designed to fit within the first radial snubbing portion leaving a gap to provide a two-stage radial spring rate function.

BRIEF DESCRIPTION OF THE DRAWING FIGURES

DETAILED DESCRIPTION OF THE INVENTION

Figure 1:
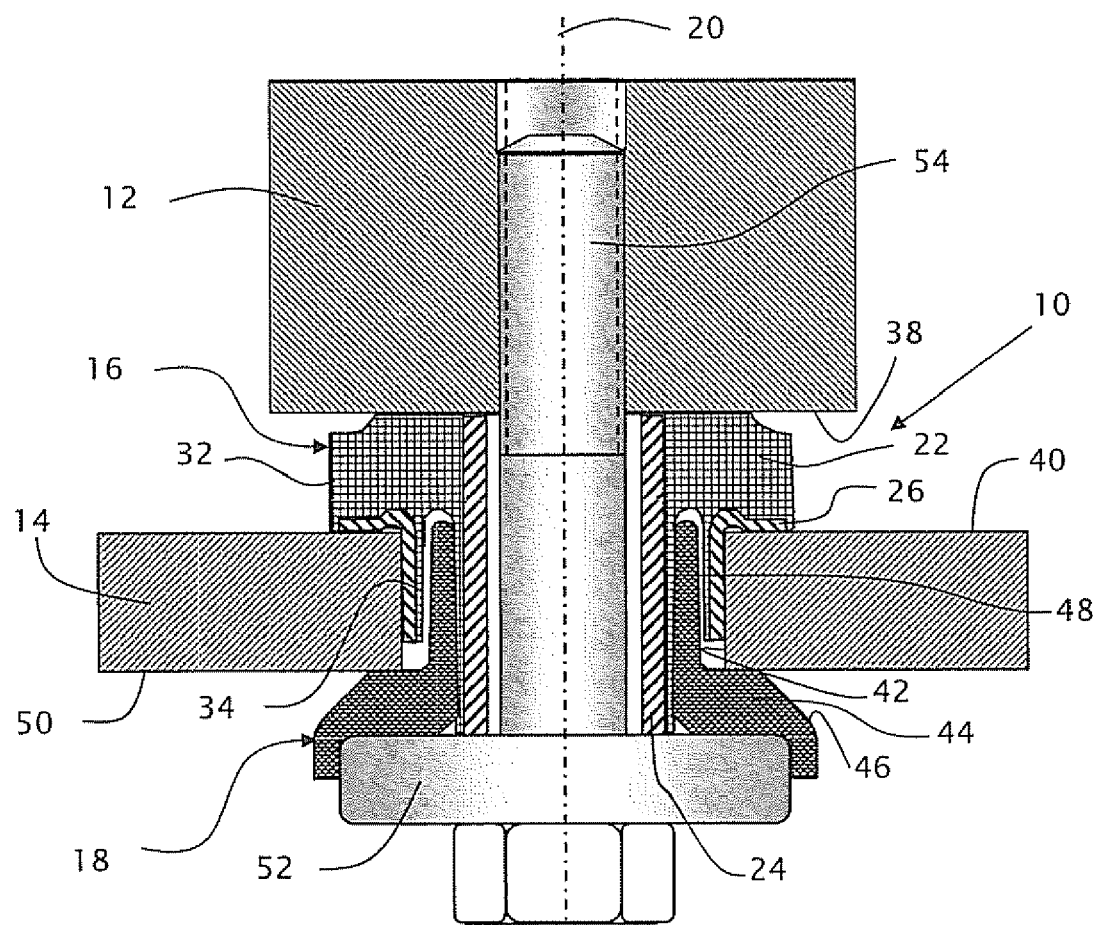
FIG. 1 is a partial cross-sectional view of a two-member center-bonded mount assembly in accordance with the invention arranged for resiliently securing a supported structure to a support structure.
Figure 2:
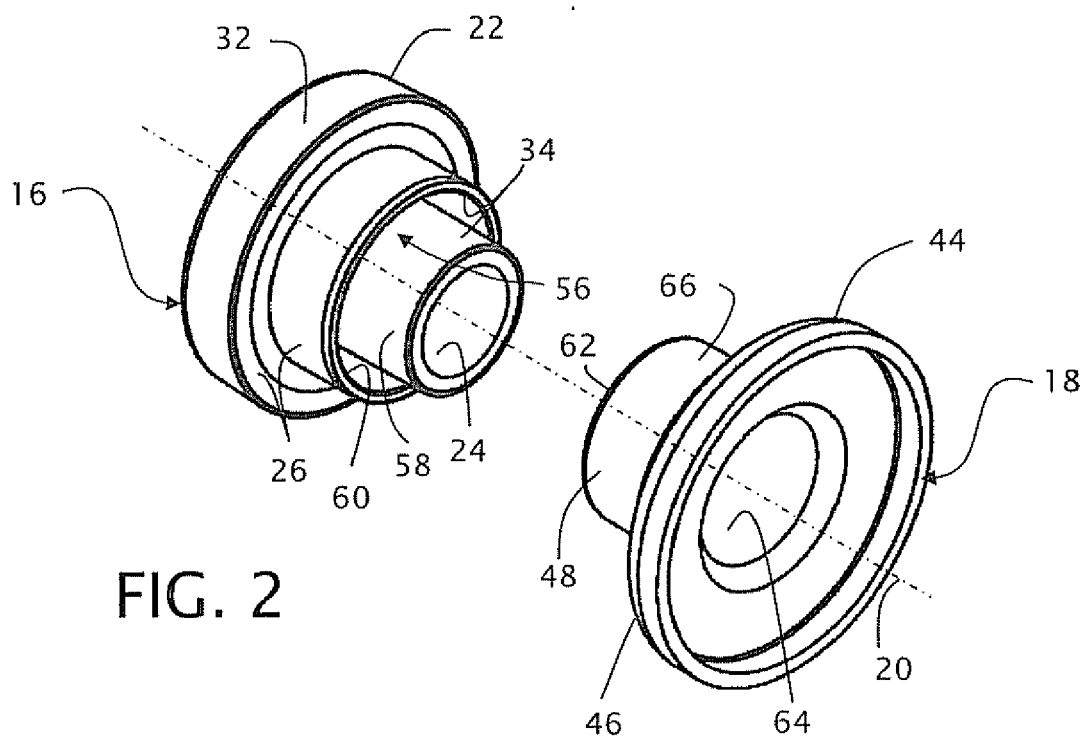
FIG. 2 is an isometric view of the two members of the center-bonded mount assembly separated along a common axis.
Figure 3:
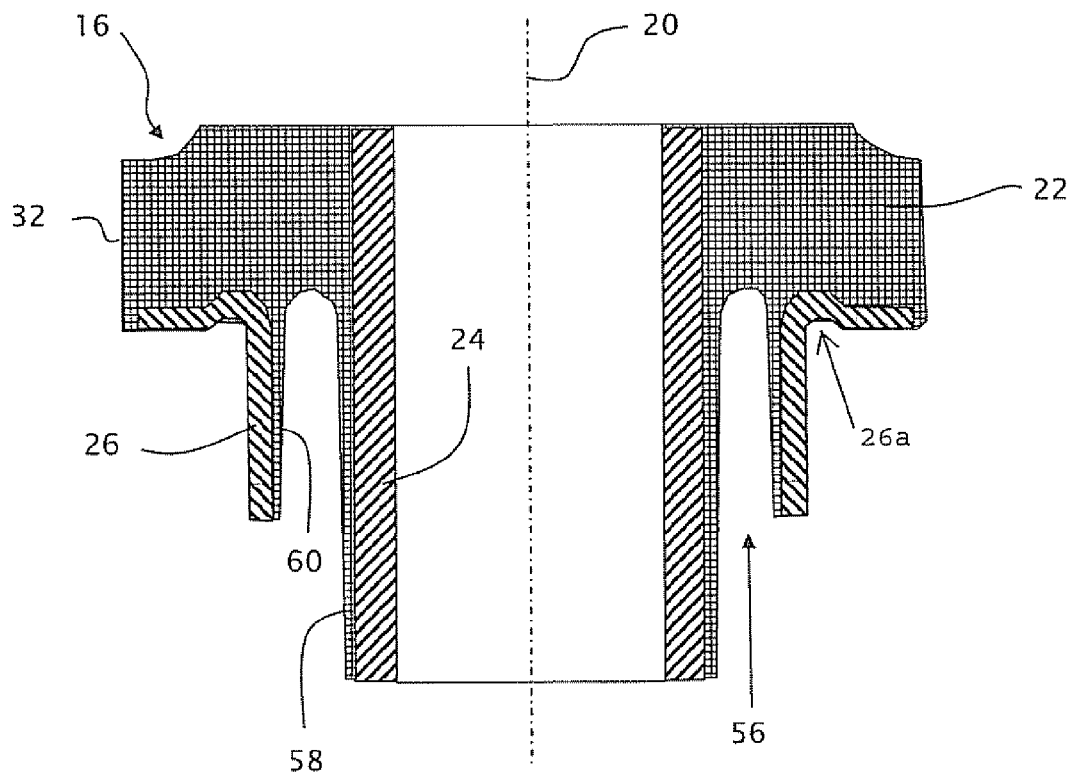
FIG. 3 is a cross-sectional view of a first of the two members of the center-bonded mount assembly.
Figure 4:
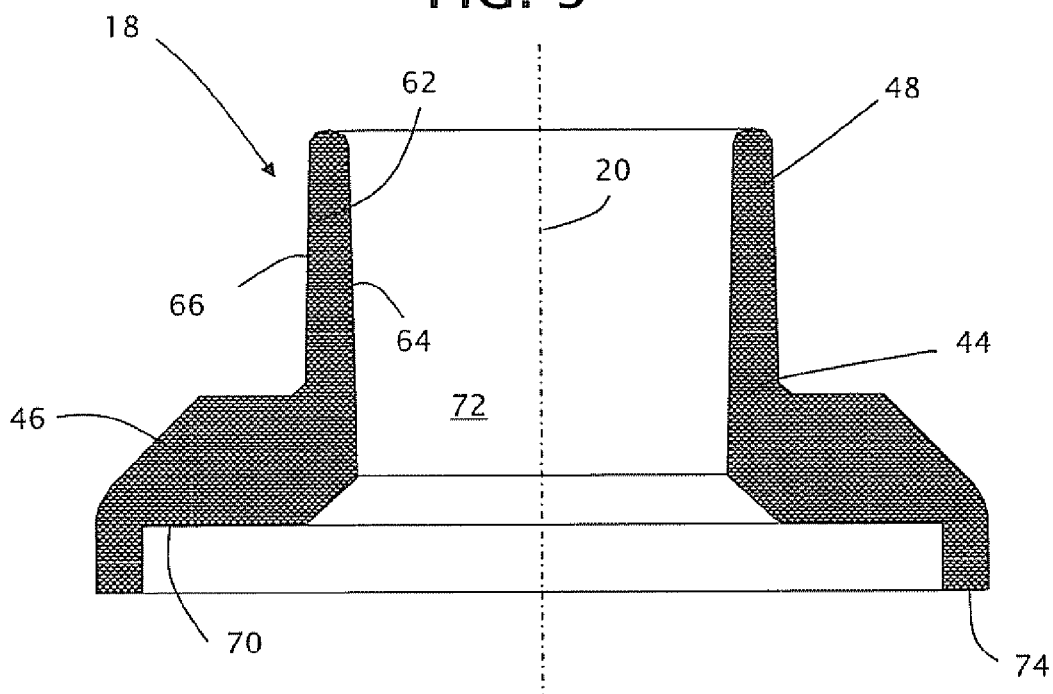
FIG. 4 is a cross-sectional view of a second of the two members of the center-bonded mount assembly.

A center-bonded mount assembly 10 in accordance with the invention is depicted in whole or part throughout FIGS. 1-6. In FIG. 1, the center-bonded mount assembly 10 is shown resiliently securing a supported structure 12 to a support structure 14. The center-bonded mount assembly 10 is assembled from two main members, a first mounting member 16 and a second mounting member 18 aligned along a common axis 20.

The first mounting member 16 includes a first elastomeric body 22 and rigid inner and outer sleeves 24 and 26. The elastomeric body 22 has a shoulder portion 32 functioning as a downward axial snubbing element and a neck portion 34 functioning as a first radial snubbing element. The shoulder portion 32 extends radially beyond the neck portion 34 and is compressed between adjacent surfaces 38 and 40 of the supported and support structures 12 and 14. The neck portion 34 extends axially within a socket 42 of the support structure 14. The rigid inner sleeve 24 extends axially through both the shoulder and neck portions 32 and 34 of the first elastomeric body 22, and the rigid outer sleeve 26 extends axially along the neck portion 34 and radially along the shoulder portion 32 of the first elastomeric body 22. Preferably the rigid outer sleeve 26 transitions from the axial neck portion extension to the radial shoulder portion extension with a perpendicular bumped angle bend including rigid bump 26a extending upward into the elastomer of the shoulder portion 32. The inner and outer sleeves 24 and 26, which are preferably made of steel, can be bonded to the elastomeric body 22 by an adhesive, such as the Lord Chemlok rubber-to-metal bonding system, including mold bonding of the elastomer to the non-elastomeric rigid sleeve surface. As shown in FIG. 1-7, the mounting members are preferably circular mounting members having circular perimeters with circumferences, preferably with the circular profiles of the first and second mounting members correlating with each other as described and shown. Preferably the circular elastomer profiles of the second mounting member 18 and its neck portion 48 provide a circular uniform neck thickness around the axis 20.

The second mounting member 18 includes a second elastomeric body 44 having a shoulder portion 46 and a neck portion 48. The shoulder portion 46, which functions as an upward axial snubbing element, extends radially beyond the neck portion 48 and is compressed between an opposite side surface 50 of the support structure 14 and a compression washer 52 for both axially preloading the first elastomeric body 22 and providing a rebound capacity. The neck portion 48, which functions as a second radial snubbing element, extends axially through the socket 42 in engagement with the neck portion 34 of the first elastomeric body 16 for providing a radial stiffness. Both elastomeric bodies 22 and 44 can be made from natural or synthetic elastomeric materials having suitable elastomeric qualities, in a preferred embodiment the elastomeric bodies are made from natural rubber. A bolt 54, which extends through the compression washer 52 and the socket 42 of the support structure 14 into a threaded engagement with the supported structure 12, compresses the two elastomeric bodies 22 and 44 until the inner sleeve 24 contacts both the compression washer 52 and the supported structure 12.

A channel 56 is formed in the neck portion 34 of the first elastomeric body 22, leaving relatively thin elastomeric sidewalls 58 and 60 bonded to the inner and outer sleeves 24 and 25. The neck portion 48 of the second elastomeric body 44 is formed as a projection 62 having opposite sidewalls 64 and 66 for extending within the channel 56 formed in the neck portion 34 of the first elastomeric body 22. Upon initial assembly as shown in FIG. 1, the innermost sidewall 64 of the projection 62 engages the innermost sidewall 58 of the channel 56, while the outermost sidewall 66 of the projection 62 remains spaced apart from the outermost sidewall 60 of the channel 56. The resulting "dead-air" space within the socket 42 provides an initially low radial stiffness governed largely by the shoulder portion 32 of the first elastomeric body 22 operating in shear until the outermost sidewall 60 of the channel 56 relatively deflects into engagement with the outermost sidewall 66 of the projection 62 wherein the elastomeric properties of the neck portions 34 and 48 of the two elastomeric bodies 22 and 44 operating in compression provide a higher radial stiffness.

Figure 5:
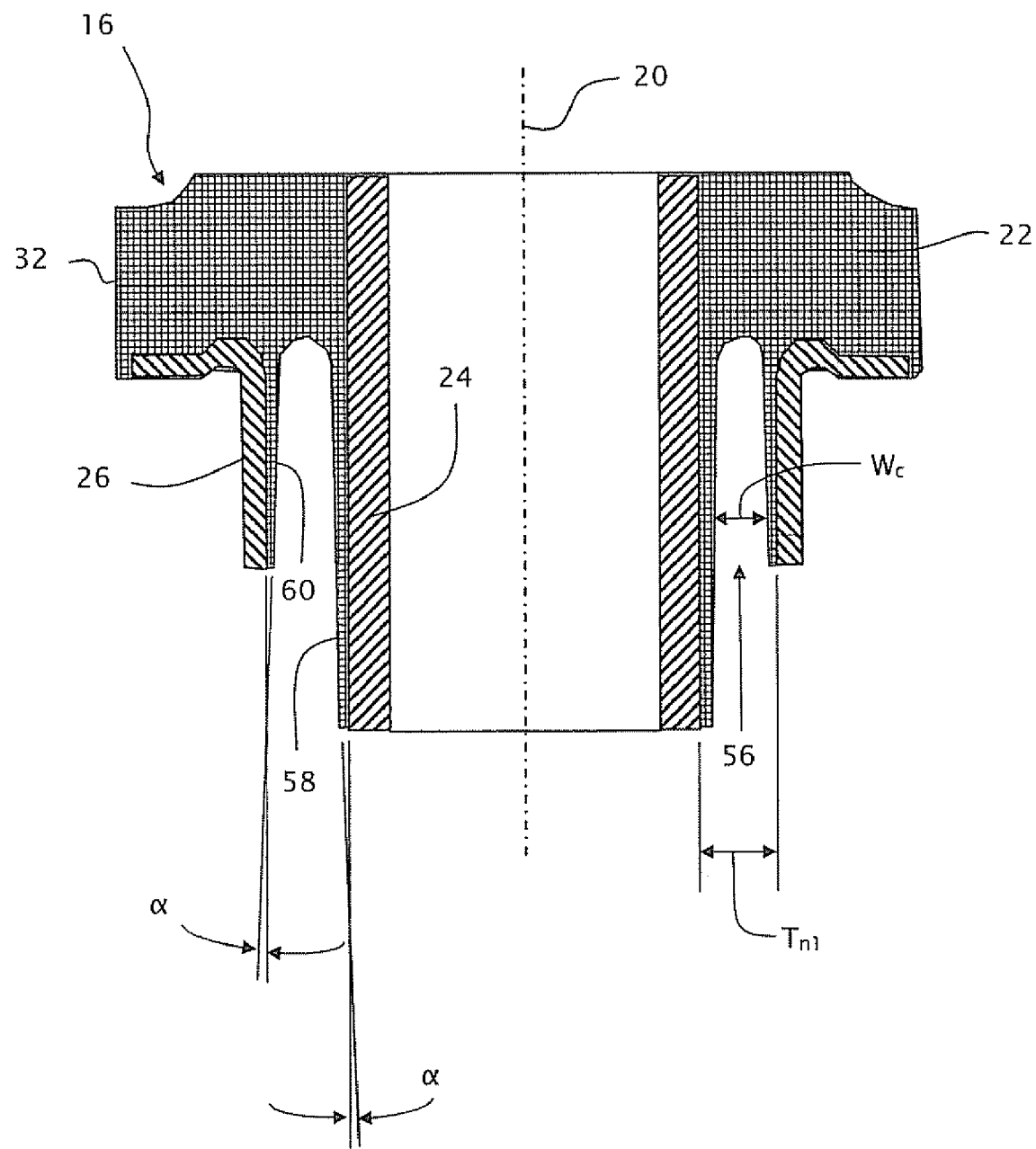
FIG. 5 is another cross-sectional view of the first member of the mount assembly showing key dimensions.
Figure 6:
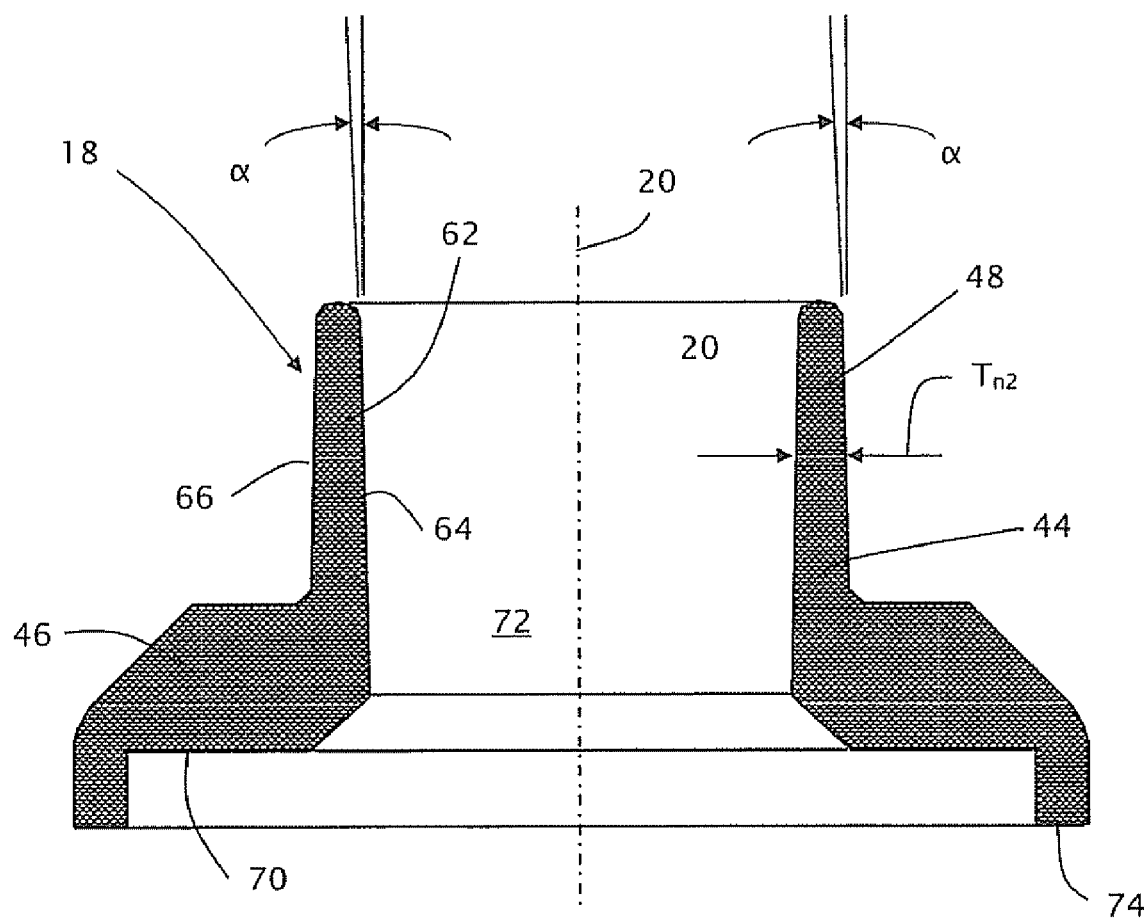
FIG. 6 is another cross-sectional view of the second member of the mount assembly showing key dimensions.

The assembly and engagement of the sidewall pairings 58, 64 and 60, 66 are assisted by providing mating tapers. As shown in FIGS. 5 and 6, all of the sidewalls 58, 60, 64 and 66 are tapered through a common angle "α", which is preferably equal to approximately one degree. The tapers of the channel sidewalls 58 and 60 are oriented for enlarging an entrance 68 to the channel 56, and the tapers of the projection sidewalls 64 and 66 are correspondingly tapered for together forming straight angles so that the sidewall pairings 58, 64 and 60, 66 mate along the common lengths of the channel 56 and the projection 62.

The shoulder portion 34 of the first elastomeric body 22 is primarily responsible for setting a downward axial spring rate function of the mount assembly 10 between the supported and support structures 12 and 14. The shoulder portion 46 of the second elastomeric body 44 is primarily responsible for setting an upward axial rebound capacity of the mount assembly 10 between the supported and support structures 12 and 14. The neck portion 48 of the second elastomeric body 44 is primarily responsible for setting the higher radial spring rate function of the mount assembly 10 between the supported and support structures 12 and 14.

The predominance of the second elastomeric body 44 over the first elastomeric body 22 for setting the higher radial spring rate function is related to the greater amount of elastomer between the sidewalls 64 and 66 of the projection 62 in comparison to the lesser amount of elastomer between the sidewalls 58 and 60 of the channel and the inner and outer sleeves 24 and 26. While an overall thickness "$T_{n1}$" of the neck portion 34 of the first elastomeric body 22 is much greater than the thickness "$T_{n2}$" of the neck portion 48 of the elastomeric body 44, the effective amount of elastomer in the neck portion 34 is reduced by a width "$W_c$" of the channel 56 such that a minimum amount of elastomer remains for lining the inner and outer sleeves 24 and 26.

The thickness "$T_{n2}$" of the neck portion 48 of the elastomeric body 44 can be varied with respect to the width "$W_c$" of the channel 56 to adjust a gap between the outermost sidewall 66 of the projection 62 and the outermost sidewall 60 of the channel 56 to set a range of motion through which the mount assembly 10 exhibits a low spring rate of radial stiffness. A higher spring rate of radial stiffness through a further range of motion can be set by adjusting a predetermined mount stiffness characteristic of the second elastomeric body 44 such as the elastic modulus or the thickness "$T_{n2}$" of the projection 62. The multiple stages include the initial stage of radial stiffness controlled mostly by the shoulder portion of the first elastomeric body and the final stage of radial stiffness controlled mostly by the neck portion of the second elastomeric body. Preferably the final stage occurs after the radial gap is overcome, preferably with the final staging radial gap overcoming the difference in the channel of first body to the neck of second body.

Similarly, a predetermined mount stiffness characteristic of the first elastomeric body 22, such as the size, shape, or elastic modulus of the shoulder portion 32, can be adjusted for setting the downward axial spring rate function of the mount assembly. While changes to the shoulder portion 32 of the first elastomeric body 22 and the neck portion 48 of the second elastomer body have disproportionate effects on the downward axial and radial stiffness of the mount assembly 10, most any change has at least some effect on both axial and radial stiffness characteristics. With this in mind, a limited number of interchangeable first mounting members 16 along with a limited number of interchangeable second mounting member 18 can be designed for assembly in different combinations to provide both a greater selection and a greater range of axial and radial stiffness characteristics for a given part count.

A matrix of first and second mounting members 16 and 18 can include first and second elastomeric bodies 22 and 44 varying in at least one predetermined mount stiffness characteristic. For example, the elastomeric bodies 22 and 44 can vary among themselves or between each other in elastomer composition. The different elastomer compositions can be selected from elastomers comprised of different elastomer components such as elastomers chosen from an elastomer components group including natural rubber (natural polyisoprene), synthetic polyisoprene (synthetic natural rubber), styrene butadiene, polybutadiene, butyl, chlorobutyl, ethylene, propylene, ethylene propylene diene monomer, chloroprene, chloro-sulfonated polyethylene, nitrile butadiene, epichlorohydrin, polyacrylate, polysulfide, polysiloxane, fluoro vinyl methyl siloxane, fluorinated hydrocarbon, urethane, and polynor-bornene. The different elastomers are preferably distinguished based on modulus properties with elastomers selected within shear modulus range of 50 to 400 psi. In preferred embodiments, elastomers can be selected with shear moduli in the range of 100 to 200 psi, and more preferably 130 to 170 psi. Different elastomers can be selected from the shear moduli psi sub-ranges such as: 100-109 psi, 110-119 psi, 120-129 psi, 130-139 psi, 140-149 psi, 150-159 psi, 160-169 psi, 170-179 psi, 180-189 psi, 190-200 psi. The different elastomers can also be distinguished based on hardness properties. In this regard, the individual elastomeric bodies formed from the plurality of elastomers can exhibit different hardness properties such as Shore A Hardness within an overall range such as 30-100. The different elastomers can be selected from sub ranges such as: 30-39 Shore A Hardness, 40-49 Shore A Hardness, 50-53 Shore A Hardness, 54-57 Shore A Hardness, 58-61 Shore A Hardness, 62-65 Shore A Hardness, 66-69 Shore A Hardness, 70-73 Shore A Hardness, 74-77 Shore A Hardness, 78-81 Shore A Hardness, 82-85 Shore A Hardness, 86-89 Shore A Hardness, 90-93 Shore A Hardness, 94-97 Shore A Hardness, and 97-100 Shore A Hardness.

The dimensions, including the sizes and shapes of the first and second elastomeric bodies 22 and 44 can also be varied throughout the matrix. The dimensional and compositional changes are preferably combined so as to provide a desired matrix of axial and radial performance characteristics. For example, the characteristics can be arranged to vary incrementally throughout the matrix. In addition, the performance matrix can be more than two-dimensional, including multi-stage spring rates and varying rebound capacities. The spring rate functions of the individual stages can be varied along with displacement thresholds between the stages.

For completing the desired performance matrix, the first and second elastomeric bodies 22 and 44 can be individually varied for exhibiting different upward axial, downward axial, and radial stiffness characteristics by choosing from among a mounting member stiffness characteristic group including an elastomeric body dimension and an elastomeric body elastic modulus. The mounting member stiffness characteristic group can be specially arranged for each of the elastomeric bodies 22 and 44. For example, the size and shape of the shoulder portion 32 of the first elastomeric body 22 are preferably among the dimensional variations of the first mounting member stiffness characteristic group and the width of the neck portion 48 of the second elastomeric body 44 is preferably among the dimension variations of the second mounting member stiffness characteristic group. The method of assembling center-bonded mounts to provided for resiliently securing a supported member to a support member by providing the matrix of plurality of first and second mounting members, preferably includes providing vehicle machine mounts for vehicle machine components of land vehicles, preferably for mounting vehicle cabs to land vehicles, with the center-bonded mounts comprising land vehicle cab mounts for mounting vehicle cabs to land vehicles. The first vehicle cab mounting members include an inner sleeve surrounded by a first elastomeric body having a downward axial snubbing portion and a first radial snubbing portion. The second vehicle cab mounting members include a second elastomeric body having an upward axial snubbing portion and a second radial snubbing portion. A first selection is made of one among the first vehicle cab mounting members differing from other of the plurality of the first vehicle cab mounting members in at least one predetermined "mount stiffness characteristic", preferably chosen from a first mounting member mount stiffness characteristic group including at least dimension and elastic modulus for supporting different axial spring rate functions. A second selection is made of one among the second vehicle cab mounting members differing from other of the plurality of second vehicle cab mounting members in at least one predetermined "mount stiffness characteristic", preferably chosen from a second mounting member mount stiffness characteristic group including at least dimension and elastic modulus for supporting different radial spring rate functions. The selected first and second vehicle cab mounting members are tightened into engagement with one another.

In an embodiment the second selection is made of one among the second vehicle cab mounting members differing from other of the plurality of second vehicle cab mounting members in at least one predetermined "mount stiffness characteristic", preferably chosen from a second mounting member mount stiffness characteristic group including at least, elastomer neck perimeter profiles, dimension and elastic modulus for supporting different radial spring rate functions. In an embodiment the elastomer neck perimeter profiles include non-circular perimeters with non-uniform perimeters around the axis 20 and circular perimeters with uniform perimeters around the axis 20. The selected first and second vehicle cab mounting members are tightened into engagement with one another.

The shoulder portion 46 of the elastomeric body 44 includes a recess 70 concentric with a through hole 72 in the elastomeric body 44 for receiving the compression washer 52. A rim 74 surrounds the recess 70 for gripping the compression washer 52 during assembly and prior to loading the mount 10.

Figure 7:
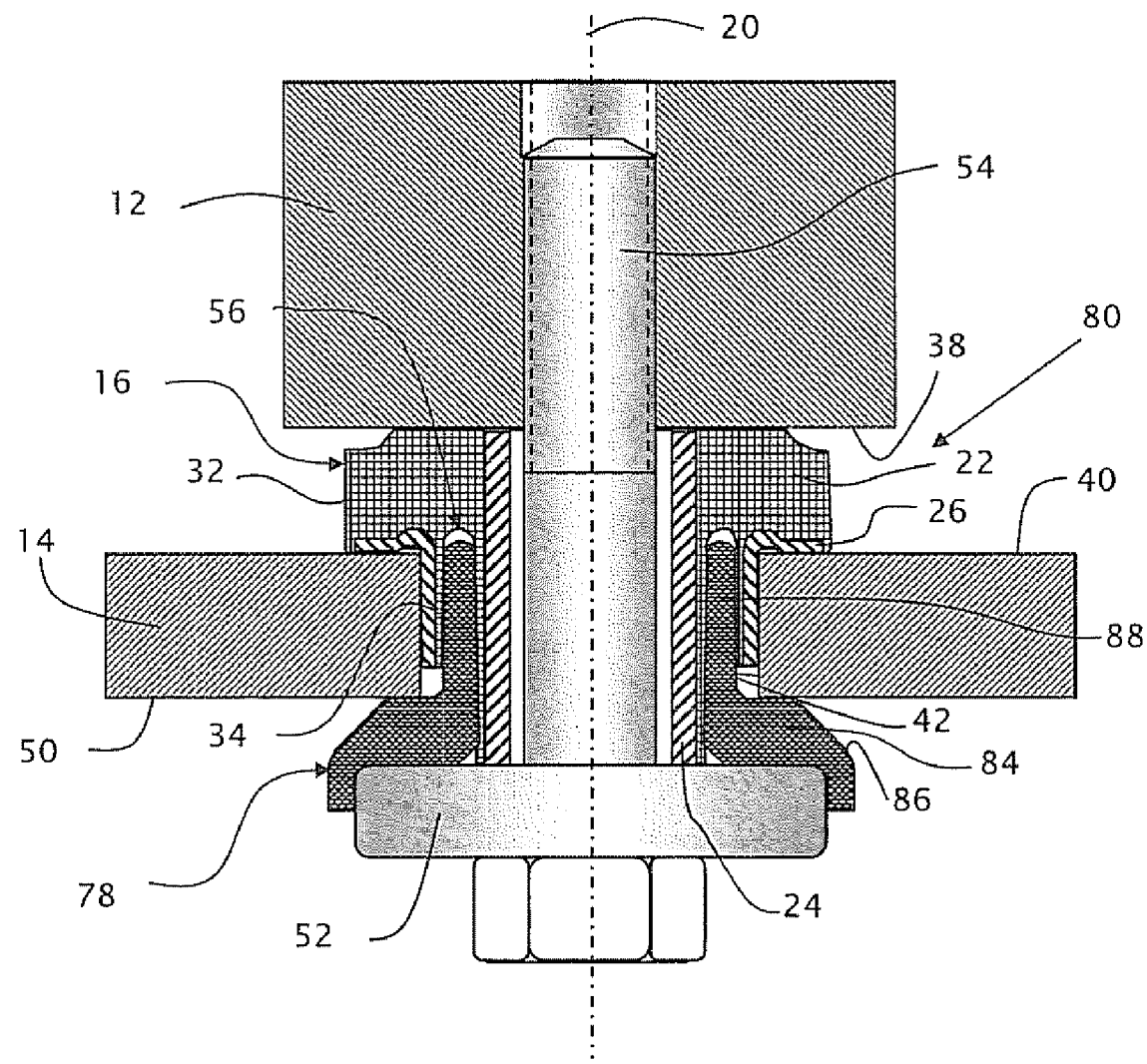
FIG. 7 is a partial cross-sectional view of an alternative two-member center-bonded mount assembly in which a thickness dimension of the second member of the assembly is modified to achieve a different radial spring rate performance objective.
Figure 8A:
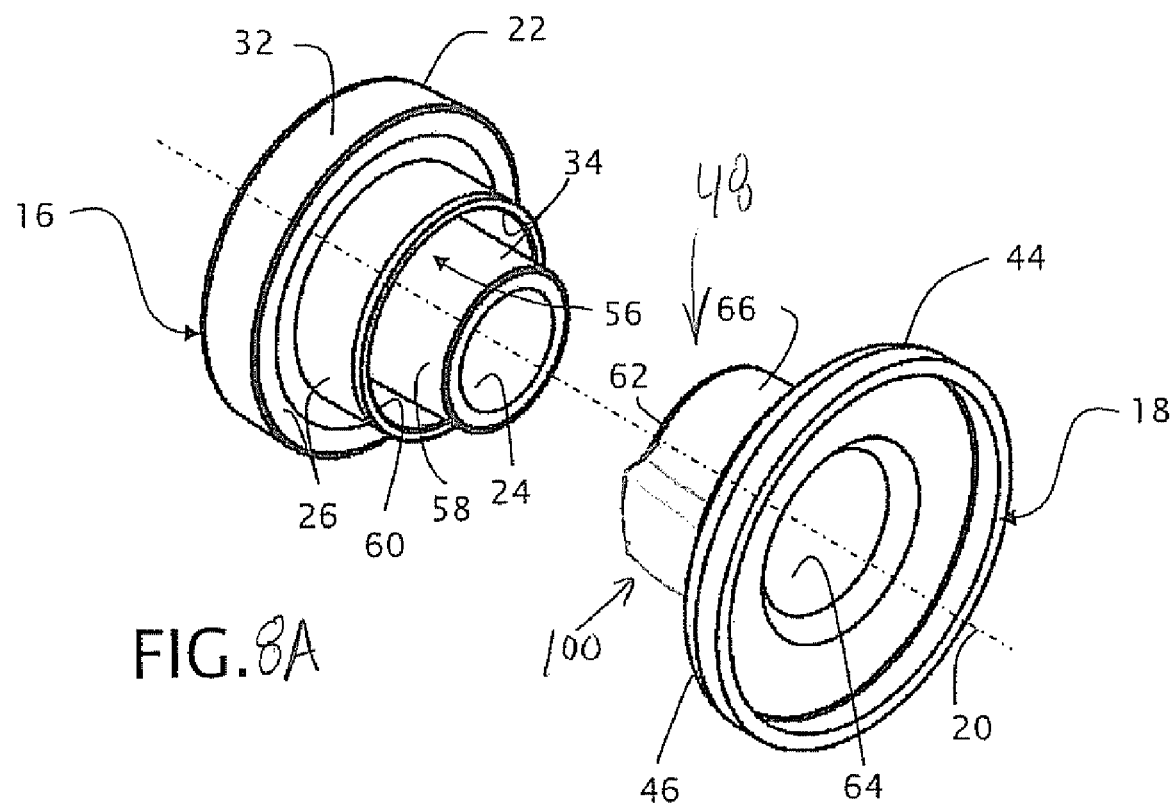
FIG. 8A is an isometric view of the alternative embodiment with two members of the center-bonded mount assembly separated along a common axis, and having a predetermined biased neck thicknesses thick portion.
Figure 8B:
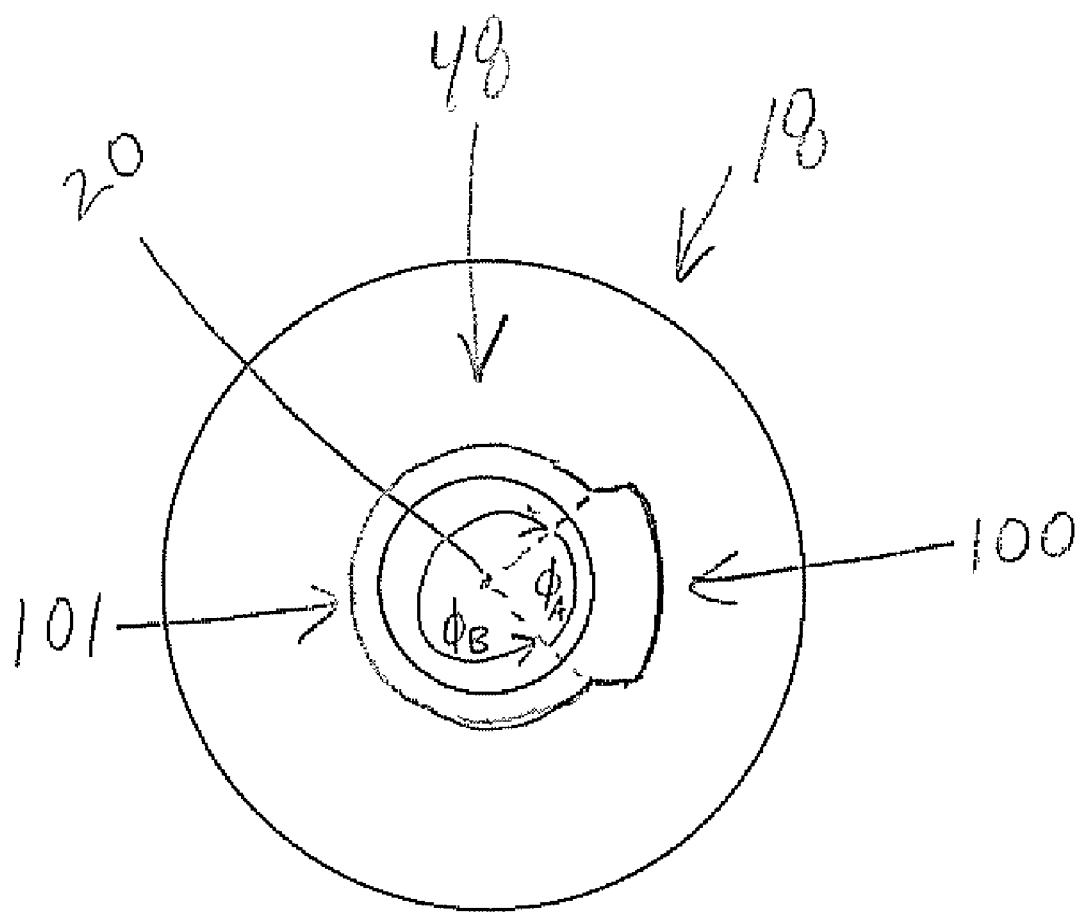
FIG. 8B is an end view of the embodiment illustrated in FIG. 8A.
Figure 8C:
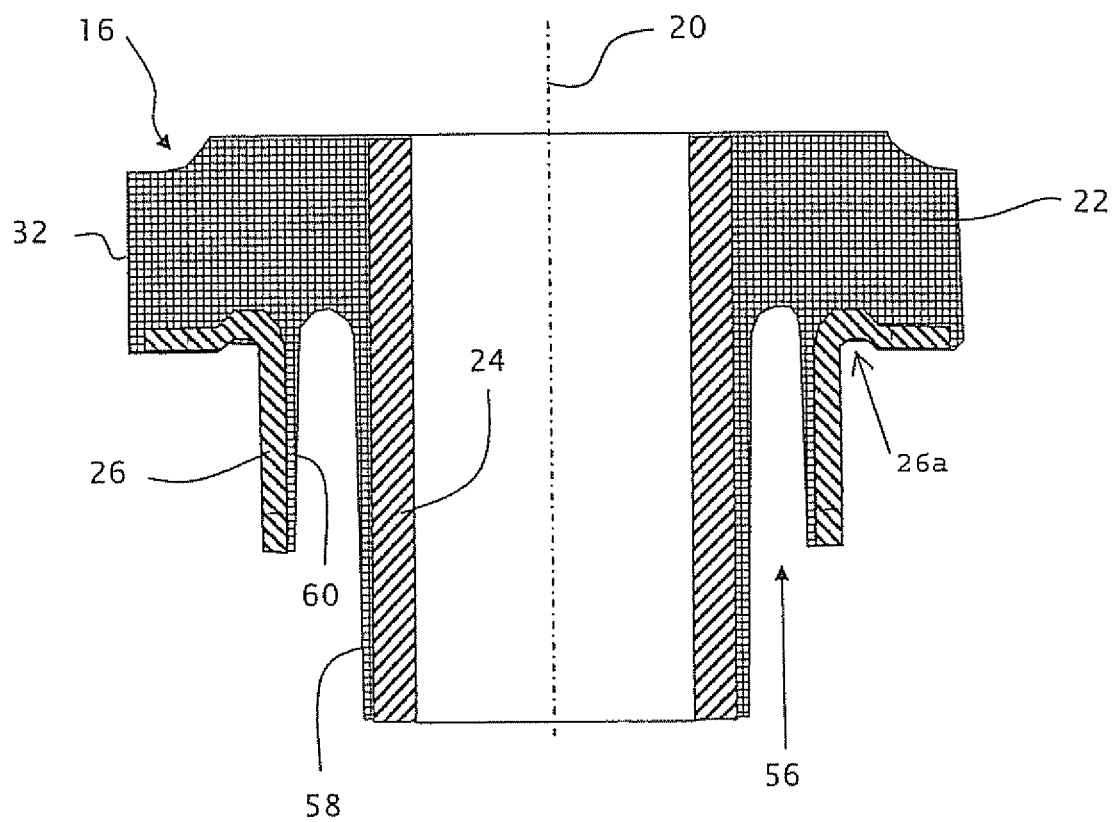
FIG. 8C is a cross-sectional view of the two members of the alternative center-bonded mount assembly illustrated in FIG. 8A.
Figure 8C:
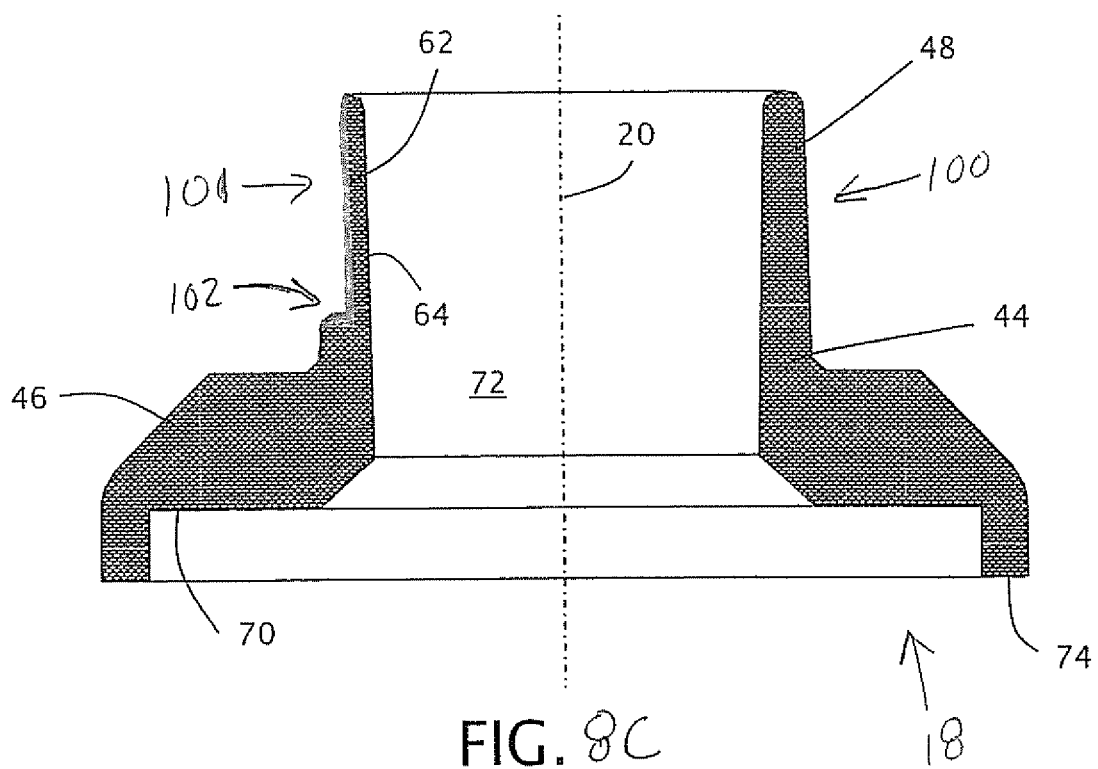
Figure 9A:
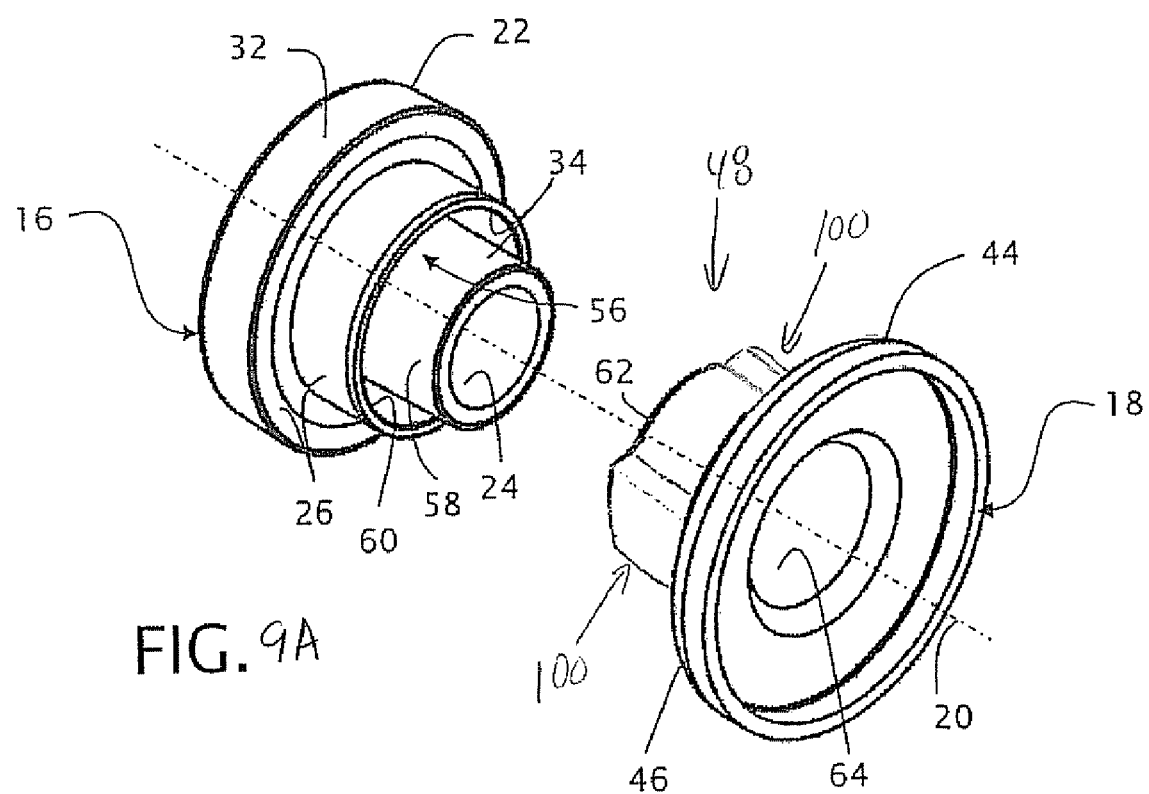
FIG. 9A is an isometric view of the alternative embodiment with two members of the center-bonded mount assembly separated along a common axis, and having a first and a second predetermined biased neck thicknesses thick portion.
Figure 9B:
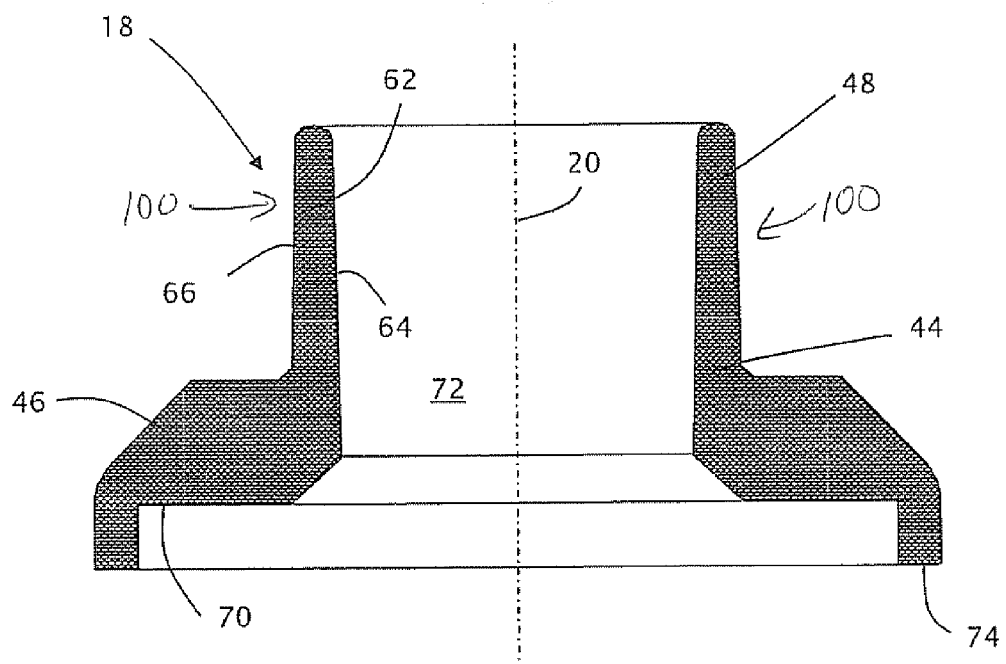
FIG. 9B is a cross-sectional view one of the two members of the alternative center-bonded mount assembly illustrated in FIG. 9A.
Figure 9C:
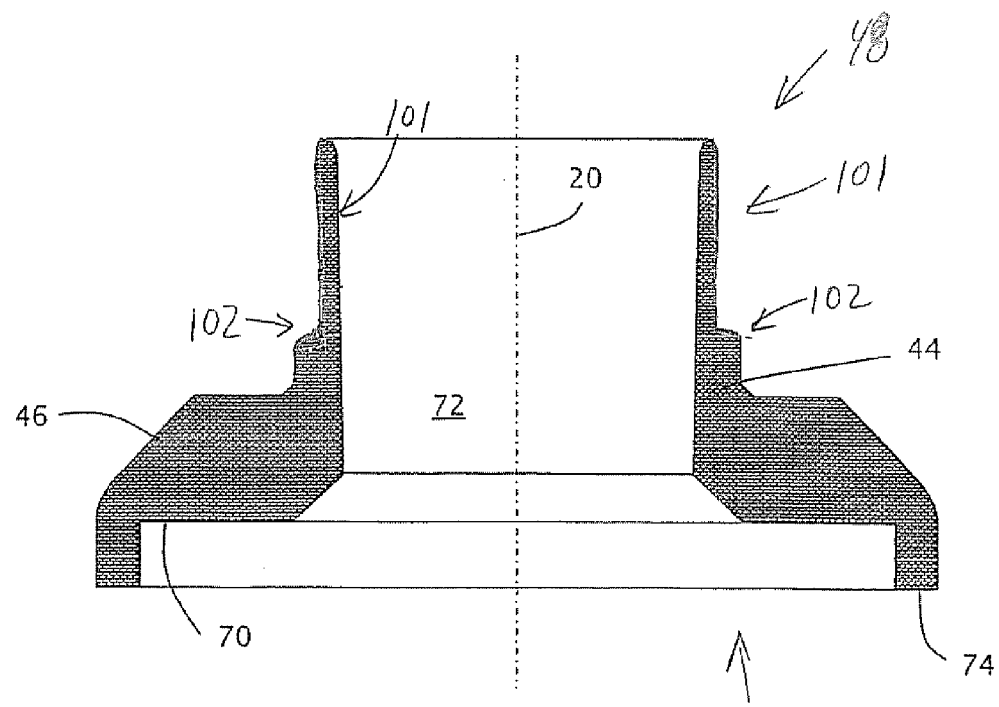
FIG. 9C is a cross-sectional view one of the two members of the alternative center-bonded mount assembly illustrated in FIG. 9A and a 90° rotated view of FIG. 9B.
Figure 9D:
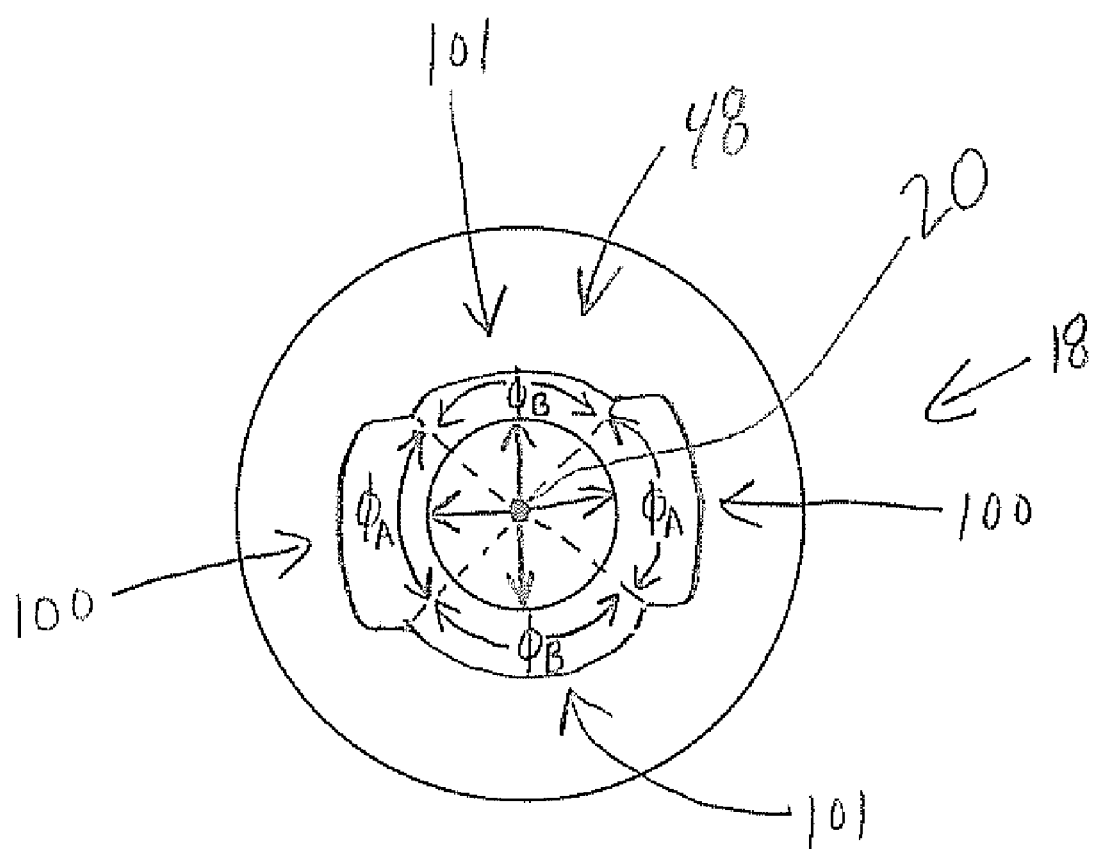
FIG. 9D is an end view of the embodiment illustrated in FIG. 9A

An alternative center-bonded mount assembly 80 as shown in FIG. 7 includes a modified second mounting member 78. The first mounting member 16 remains unchanged and the same reference numerals apply to corresponding elements. The second mounting member 78 includes a second elastomeric body 84 having a shoulder portion 86 and a neck portion 88. In contrast to the preceding embodiment, an annular projection 92 of the neck portion 88 is increased in thickness sufficient to contact opposite sidewalls of the channel 56 in the neck portion 34 of the first mounting member 16.

Thus, the modified neck portion 88 eliminates the gap (i.e., dead air space) within the socket 42 along with the initially lower radial stiffness of the preceding embodiment. Instead, the alternative center-bonded mount assembly 80 exhibits a single stage of radial stiffness controlled largely by the elastomeric performance characteristics of the neck portion 88 of the second elastomeric body 84.

As shown in FIG. 8-9, an alternative embodiments the mounting members are preferably non-circular mounting members having non-circular perimeters with non-uniform perimeters around the axis 20, preferably with the non-circular profiles of the second mounting members proving different radial stiffness in at least two directions with a different neck thickness of the molded bottom ring in those at least two different directions. Preferably the non-circular elastomer profiles of the second mounting member 18 and its neck portion 48 provide predetermined biased neck thicknesses around the axis 20 at predetermined polar coordinates around the axis. As shown in FIG. 8A-C, the neck portion 48 includes a predetermined biased neck thicknesses thick portion 100 at predetermined angular coordinates $\phi_A$ and predetermined biased neck thicknesses thin portion 101 at predetermined coordinates $\phi_B$. Preferably the predetermined biased neck thicknesses thin portion 101 includes a lower thickening centering elastomer portion 102. FIG. 9A-D, the neck portion 48 includes a first and second predetermined biased neck thicknesses thick portion 100 at predetermined coordinates $\phi_A$ and predetermined biased neck thicknesses thin portion 101 at predetermined coordinates $\phi_B$. Preferably the predetermined biased neck thicknesses thin portions 101 includes lower thickening centering elastomer portions 102. In an embodiment the transition from thick to thin is sharp. In an embodiment the transition from thick to thin is gradual. Such predetermined biased neck thicknesses around the axis 20 at predetermined polar coordinates provides a means for stiffness tuning. In a preferred alternative embodiment the stiffness tuning includes providing no radial snubbing in the fore-aft direction, while an at least 1 mm radial snubbing gap in the lateral direction, which provides a stiffer fore-aft radial stiffness than the lateral radial stiffness, such as in FIG. 9. In a preferred alternative embodiment the stiffness tuning includes providing a zero snubbing gap and the resulting higher radial stiffness in the only one direction (such as in FIG. 8), preferably with such aligned relative to a vehicle's dynamics, such as front for applications for reacting an engine thrust. Preferably with such non-circular elastomer profiles of the second mounting member 18 and its neck portion 48 provide predetermined biased neck thicknesses around the axis 20 at predetermined polar coordinates around the axis, second mounting member 18 is marked with an orienting indicator that indicates its predetermined polar coordinates around the axis, preferably with the orienting indicator embossed in a portion of the elastomer, such as an arrow indicating the direction for its installation.

Although illustrated and described with respect to preferred embodiments, those of skill in the art will appreciate the variations and accommodations that can be made in accordance with the teachings of this invention for different types of mounting applications or conditions of use.

The invention claimed is:

1. A center-bonded mount assembly for securing a supported structure to a support structure comprising:
   first and second elastomeric bodies having neck and shoulder portions, the neck portions being shaped for extending axially within a socket of the support structure and the shoulder portions being shaped for extending radially beyond the socket in engagement with opposite side surfaces of the support structure,
   inner and outer sleeves bonded to the first elastomeric body,
   the inner sleeve extending axially through both the neck and shoulder portions of the first elastomeric body, and the outer sleeve extending axially along the neck portion of the first elastomeric body,
   a channel formed in the neck portion of the first elastomeric body in a position apart from the inner and outer sleeves, and
   a projection formed by the neck portion of the second elastomeric body for extending within the channel formed in the neck portion of the first elastomeric body.

2. The mount assembly of claim 1 in which an elastomeric material forming the neck portion of the first elastomeric body has a radial thickness less than a radial thickness of an elastomeric material forming the neck portion of the second elastomeric body such that a radial stiffness exhibited by the mount assembly is influenced more by the neck portion of the second elastomeric body than by the neck portion of the first elastomeric body.

3. The mount assembly of claim 2 in which the channel has inner and outer sidewalls formed by elastomeric material bonded to the inner and outer sleeves and the projection has mating inner and outer sidewalls for engaging the sidewalls of the channel.

4. The mount assembly of claim 3 in which a radial thickness between the sidewalls of the second elastomeric body is less than a radial thickness between the sidewalls of the channel in the first elastomeric body to provide multiple stages of the radial stiffness.

5. The mount assembly of claim 3 in which at least one of the inner and outer sidewalls of the channel in the first elastomeric body is axially tapered for relatively enlarging an entrance to the channel and in which at least one of the mating inner and outer sidewalls of the second elastomeric body is correspondingly tapered.

6. The mount assembly of claim 5 in which the axially tapered sidewalls of the first and second elastomeric bodies enter into a frictional engagement during assembly and prior to loading the mount assembly.

7. The mount assembly of claim 1 in which the shoulder portion of the second elastomeric body has a through hole and a recess surrounding the through hole for receiving a washer.

8. The mount assembly of claim 7 in which a rim surrounding the recess provides for gripping the washer during assembly and prior to loading the mount assembly.

9. The mount assembly of claim 1 in which the neck portion of the second elastomeric body is sized to extend through both opposite side surfaces of the support structure.

10. The mount assembly of claim 1 in which the inner and outer sleeves are made of a rigid, non-elastomeric material.

11. The mount assembly of claim 10 in which the outer sleeve extends radially along the shoulder portion of the first elastomeric body.

12. The mount assembly of claim 11 in which the axially and radially extending portions of outer sleeve have a clearance therebetween, the clearance being from a peripheral edge of the socket in the support structure.

13. A center-bonded mount assembly for providing a resilient mounting exhibiting axial and radial spring rate functions between a supported structure and a support structure comprising:

first and second mounting members, the first mounting member including an inner sleeve and a first elastomeric body surrounding the inner sleeve having a downward axial snubbing portion arranged for engaging adjacent surfaces of the support and supported structures and a first radial snubbing portion arranged for extending within a socket formed through the support structure, the second mounting member including a second elastomeric body having an upward axial snubbing portion arranged for engaging an opposite side surface of the support structure and a second radial snubbing portion arranged for extending within the socket formed through the support structure, and the second radial snubbing portion being arranged with respect to the first radial snubbing portion to provide more influence than the first radial snubbing portion over the radial spring rate of the center-bonded mount assembly and in which the second radial snubbing portion has a radial thickness greater than first radial snubbing portion to provide more influence than the first radial snubbing portion over the radial spring rate function of the center-bonded mount assembly.

14. The mount assembly of claim 13 in which the second radial snubbing portion has an elastic modulus different from first radial snubbing portion.

15. The mount assembly of claim 13 in which the second radial snubbing portion is arranged for engaging the first radial snubbing portion while leaving a radial gap within the socket formed through the support structure to provide multiple stages of radial stiffness.

16. The mount assembly of claim 15 in which the radial spring rate function has at least two stages, a first of the stages exhibiting a lower spring rate than a second of the stages.

17. The mount assembly of claim 13 in which the first radial snubbing portion includes a neck portion with an annular channel and the second radial snubbing portion includes a neck portion with an annular projection sized for fitting within the annular channel of the first radial snubbing portion.

18. The mount assembly of claim 17 in which the annular channel has a width larger than the annular projection so that a gap remains between the annular projection and the annular channel at an initial loading of the mount assembly.

19. The mount assembly of claim 18 in which the first mounting member includes an outer sleeve supporting one sidewall of the annular channel and the inner sleeve supports an opposite sidewall of the annular channel.

20. The mount assembly of claim 18 in which at least one of the sidewalls of the annular channel is radially tapered for enlarging an entrance to the channel.

21. The mount assembly of claim 20 in which the annular projection has sidewalls and at least one of the sidewalls of the annular projection is tapered for mating with the tapered sidewall of the annular channel.

22. The mount assembly of claim 13 in which the second elastomeric body has a through hole and a recess surrounding the through hole for receiving a washer.

* * * * *